United States Patent
Losa

(10) Patent No.: US 7,763,273 B2
(45) Date of Patent: Jul. 27, 2010

(54) METHOD FOR REDUCING METHANE PRODUCTION EMANATING FROM THE DIGESTIVE ACTIVITIES OF AN ANIMAL

(75) Inventor: Riccardo Losa, Biére (CH)

(73) Assignee: DSM IP Assets B.V., Te Heerlen (NL)

( * ) Notice: Subject to any disclaimer, the term of this patent is extended or adjusted under 35 U.S.C. 154(b) by 702 days.

(21) Appl. No.: 10/514,257

(22) PCT Filed: Apr. 29, 2003

(86) PCT No.: PCT/EP03/04555

§ 371 (c)(1),
(2), (4) Date: Mar. 31, 2006

(87) PCT Pub. No.: WO03/094628

PCT Pub. Date: Nov. 20, 2003

(65) Prior Publication Data

US 2006/0188604 A1   Aug. 24, 2006

(30) Foreign Application Priority Data

May 14, 2002 (SE) .................................... 0201448

(51) Int. Cl.
*A23K 1/14* (2006.01)
*A23K 1/16* (2006.01)
*A23K 1/18* (2006.01)
*A61K 31/05* (2006.01)

(52) U.S. Cl. .................... 424/438; 424/442; 426/2; 426/71; 426/651; 514/731

(58) Field of Classification Search .............. None
See application file for complete search history.

(56) References Cited

U.S. PATENT DOCUMENTS

| 3,021,216 | A | * | 2/1962 | Walter et al. | 514/311 |
|---|---|---|---|---|---|
| 4,333,923 | A | * | 6/1982 | Beck et al. | 424/115 |
| 5,558,889 | A | * | 9/1996 | Rossi | 426/89 |
| 5,565,211 | A | * | 10/1996 | Rossi | 424/438 |

FOREIGN PATENT DOCUMENTS

| JP | 2002 291912 | | 10/2002 |
|---|---|---|---|
| WO | WO 9959430 | | 11/1999 |
| WO | WO 00/69277 | * | 11/2000 |
| WO | WO 0069277 | | 11/2000 |
| WO | WO 02052949 A1 | | 7/2002 |
| WO | WO 02085132 A1 | | 10/2002 |

OTHER PUBLICATIONS

J.D. Evans et al. : "Effects of Thymol on Ruminal Microorganisms" Current Microbiology, (2000) pp. 336-340, V41, N5, XP008020331.
G.A. Broderick et al.: "Chemical Inhibition of Amino Acid Deamination by Ruminal Microbes in Vitro" Jouran of Animal Science (1979) pp. 1101-1111, V49, N4 XP-002963698.

* cited by examiner

*Primary Examiner*—Sharmila Gollamudi Landau
*Assistant Examiner*—Kevin S Orwig
(74) *Attorney, Agent, or Firm*—Nixon & Vanderhye P.C.

(57) ABSTRACT

The present invention generally relates to a method for reducing the production of methane emanating from the digestion of animal by using one or more essential oil compounds selected from the group consisting of limonene, eugenol, a silicylate, quinoline, vanilla, thymol and a cresol, which are administered to the animal feed.

3 Claims, No Drawings

METHOD FOR REDUCING METHANE PRODUCTION EMANATING FROM THE DIGESTIVE ACTIVITIES OF AN ANIMAL

PRIORITY CLAIM TO RELATED PATENT APPLICATIONS

This patent claims priority under 35 U.S.C. §371 to International Patent Application No. PCT/EP2003/004555 (filed Apr. 29, 2003), which, in turn, claims priority to Sweden Patent Application No. 0201448.8 (filed May 14, 2002). The entire text of each of the above-referenced patent applications is incorporated by reference into this patent.

FIELD OF THE INVENTION

The present invention relates to a method for reducing the production of methane emanating from the digestive activities of an animal by using, as an active ingredient, one or more essential oil compounds selected from the group consisting of eugenol, limonene, a salicylate, quinoline, vanilla, thymol or a cresol. The active compounds can be orally administrated via a feed or a drinking water.

BACKGROUND OF THE INVENTION

Methane is a greenhouse gas, which is many times more potent than $CO_2$. Its concentration in the atmosphere has doubled over the last century and continues to increase alarmingly. Ruminants are the major contributors to the biogenic methane formation, and it has been estimated that the prevention of methane formation from ruminants would almost stabilise atmospheric methane concentrations. Furthermore, the recent re-assessment of the Kyoto protocol places increased priority in decreasing methane emissions as part of a multi-gas strategy. The most effective feed additives for reducing the formation of methane contain antibiotics and ionophores which diminish the formation of microorganisms provided $H_2$ to the methanogenes. However, the effect of antibiotic and ionophores on the formation of methane is limited.

Besides the increase of the greenhouse gases, the methane produced during the anaerobic fermentation also represents an energy loss to the host animal. Carbohydrate makes up 70-80% of the dry matter in a typical dairy cattle ration and in spite of this, the absorption of carbohydrates from the gastro-intestinal tract is normally very limited. The reason for this is the extensive fermentation of carbohydrates in the rumen resulting in production of acetate, propionate and butyrate as the main products. These products are part of the so called volatile fatty acids, VFA. The fermentation that produces the VFA, e.g. propionic acid, also provides energy and carbon for the growth and maintenance of the microbial community. VFA are important by-products of the microbial activity.

Furthermore, in recent years there has been an intense debate about the use of chemicals and antibiotics in feed additives and in many countries a ban on this type of additions to feed additives is being considered. Thus, there is an urgent need for agriculture to develop substances which are in line with reliable and generally accepted practice and not of a medicinal nature.

SUMMARY OF THE INVENTION

The purpose of the present invention is to provide a component which is not of medicinal nature and which strongly reduces the formation of methane but maintains the microbial activity and the consent of VFA, e.g. propionic acid, on normal levels.

It has now been found that single essential oil compounds or mixtures of two or more essential oil compounds, being present in different parts of cultivated, utility plants, can essentially reduce the formation of methane and still maintain the overall microbial activity on a high level.

More specific the present invention relates to a method for reducing the production of methane emanating from the digestions of an animal by using one or more essential oil compounds selected from the group consisting of limonene, eugenol, a salicylate, quinoline, vanilla, thymol and a cresol, which are administrated to the animal.

DETAILED DESCRIPTION OF THE INVENTION

The essential oil compounds are suitably orally administrated via animal feeds and drinking waters but also tablets and capsules may be used. The essential oil compounds have a considerable methane-reducing effect while their effect on the formation of VFA is evidently lower. The essential oil compounds represented by salicylates, quinoline and vanilla have a methane-reducing effect as well as a promoting effect on the formation of VFA. Thymol and especially the cresols have a strong methane-reducing effect and a notable reducing effect on the formation of VFA. The active essential oil compounds as described above are suitably administrated per day in an amount from 0.01-50 mg/kilo bodyweight of the animal, preferably 0.1-20 mg/kilo bodyweight of the animal.

Suitably the essential oil compounds contain a) 5-100% by weight of limonene, eugenol or a mixture thereof, b) 0-95% by weight of one or more essential oil compounds selected from the group consisting of the salicylate, such as amyl salicylate and benzyl salicylate, quinoline and vanilla, c) 0-60% by weight of thymol, the cresol, such as m-cresol, or a mixture thereof.

In an embodiment of the invention the essential oil compounds contain a mixture of a) limonene and/or eugenol, b) one or more essential oil compounds selected from the group consisting of the salicylate, such as amyl salicylate and benzyl salicylate, quinoline and vanilla in an amount of 20-300% by weight based on the amount of limonene and eugenol, and c) thymol, the cresol, such as m-cresol, or a mixture thereof in an amount of 0-50% by weight of the amount of limonene and eugenol.

This mixture of essential oil compounds considerably reduces the methane formation and keep the formation of VFA on a desirable level. In case a high decrease in methane formation is wanted, the cresol and/or thymol could be incorporate in the mixture in a total amount of 10-50% by weight of the amount of limonene and eugenol.

The incorporation of the essential oil compounds of the invention into the animal feed or into the drinking water is suitable done by adding them directly to an animal feed composition or drinking water, or to a feed premix additive or a drinking water supplement. Suitably, the feed premix contains 0.1-20% by dry weight of the essential oil compounds, 0-20% by dry weight of growth improving additives and flavourings and 10-99% by weight of an absorbing support. Example of suitable growth-improving additives and flavourings are creosol, anethol, deca-, undeca- and/or dodeca-lactones, ionones, irone, gingerol, piperidine, propylidene phatalide, butylidene phatalide, capsaicin and/or tannin. The support may contain, for example, 40-50% by weight of wood fibres, 8-10% by weight of stearine, 4-5% by weight of curcuma powder, 4-5% by weight of rosemary powder, 22-28% by weight of limestone, 1-3% by weight of a gum, such as gum arabic, 5-50% by weight of sugar and/or starch and 5-15% by weight of water. This premix can also contain 0-89% by weight of other feed components, suitably selected from the group consisting of vitamins, enzymes, mineral salts, ground cereals, protein-containing components, carbohydrate-containing components, wheat middlings and/or brans. The premix additive is suitably added in the preparation of a feed composition according to the invention in such quantities that the feed will contain 0.1-2500 ppm, preferably 1-1000 ppm, of the essential oil compounds. The premix normally constitutes 0.3-3.5% by weight of the feed composition.

The feed composition according to the invention usually contains, calculated on the dry weight of the feed, the following ingredients.

a) 0-80%, preferably 10-70%, by weight of cereals, b) 0-30%, preferably 1-12%, by weight of fat, c) 0-85%, preferably 10-50%, by weight of protein-containing nutritious substances of a type other than cereals, and d) 0.1-2500 ppm, preferably 1-1000 ppm, of the essential oil compounds.

The total amounts of a)-d) are preferably at least 80% by weight.

When preparing the feed composition, the feed premix can be mixed with the dry ingredients consisting of cereals, such as ground or crushed wheat, oats, barley, maize and rice; vegetable protein sources based on e.g. rape-seed, soya bean and sunflower seed; animal protein sources, such as fish meal; molasses; and milk products, such as various milk powders and whey powders. After mixing all the dry additives, the liquid ingredients and ingredients, which after heating become liquid, can be added. The liquid ingredients may consist of lipids, such as fat, for example vegetable fat, optionally liquefied by heating, and/or of carboxylic acids, such as a fatty acid. After thorough mixing, a mealy or particulate consistency is obtained, depending on the degree grinding of the ingredients. To prevent separation during storage, water should preferably be added to the animal feed, which then is subjected to a conventional pelletizing, expanding or extruding process. Any excess water can be removed by drying. If desired, the resulting granular animal feed can also be crushed to a smaller particle size. The described feed composition is usually the administrated in combination with dried green forage and/or silage.

The drinking water supplement may contain 1-99% by dry weight, preferably 10-50% by dry weight, of the essential oil compounds. Beside the essential oil compounds the supplement may also contain 1-99% by dry weight of a large number of other ingredients. Examples of other ingredients are mineral salts, vitamins, health and growth enhancing additives, flavourings, water-soluble or water-dispersable carriers, such as sugars, powdered milk, milk-by-products and cellulose derivatives, dispersing agents and stabilisers, such as water-soluble or water-dispersable polymers. When preparing the drinking water, the supplement is normally added to the water in such an amount that the concentration of the essential oil compounds becomes 1-2500 ppm, preferably 1-1000 ppm.

Within the scope of the invention, it is also possible to produce a suspension of the feed composition. This is especially convenient if the feed is prepared for immediate consumption.

The present invention will now be further illustrated by the following Examples.

Example 1

The efficacy of some essential oil compounds obtainable from plants was tested regarding their influence on the formation of methane and VFA in an in vitro system.

According to the test 200 mg of a ground diet, containing 50% hay, 30% barley, 9.5% molasses, 10% fishmeal and 0.5% vitamins, was added to wheaton bottles. To a triplicate of bottles containing the diet, 0.6 ml of a dissolution of one of the essential oil compounds mentioned in the table below, into propylene glycol was added to each bottle.

Three sheep were fed on the ground diet and strained rumen fluids in amounts of 500 ml were mixed with 1000 ml of Colemans Simplex buffer. The buffer had the following composition.

Colemans Simplex Buffer

| Premix of a salt solution, g/l | |
|---|---|
| $K_2HPO_4$ | 12.7 |
| $KH_2PO_4$ | 10.0 |
| NaCe | 1.3 |
| $MgSO_4.7H_2O$ | 0.18 |
| $CaCl_2$ (dried) | 0.09 |
| Buffer | |
| Salt solution | 40 ml |
| 5% (w/v) $NaHCO_3$ | 15 ml |
| 2% HCl salt of cysteine | 1.1 ml |
| Water | 60 ml |

30 ml of the combined rumen fluid and the buffer were then introduced into the bottles, and their contents were incubated under $CO_2$ at 39° C. for 24 hours. The methane production and the total amount of VFA was then measured.

The following results obtained are shown in Table I.

TABLE I

| Test | Essential oil compounds Type | Amount of dissolution % by weight | Methane production mmol/24 hours | Total VFA mmol/24 hours |
|---|---|---|---|---|
| Control | Water | — | 1255 | 1250 |
| 1 | Vanilla | 2 | 1055 | 1300 |
| 2 | Thymol | 5 | 250 | 400 |
| 3 | Oxophorone | 0.4 | 1400 | 1350 |
| 4 | m-cresol | 9 | 150 | 200 |
| 5 | Resorcinol | 1.4 | 1350 | 1375 |
| 6 | Limonene | 1 | 550 | 1250 |
| 7 | Quinoline | 1 | 900 | 1300 |
| 8 | Guajacol | 3.6 | 1350 | 1250 |
| 9 | Eugenol | 3 | 300 | 800 |
| 10 | Benzyl salicylate | 3 | 850 | 1600 |

The results clearly show that the essential oil compounds according to the invention have a potential for considerably reducing the production of methane, while the formation of VFA is not reduced in the same extent.

Example 2

The effect of a blend of equal amounts of the dissolutions of essential oil compounds mentioned in Example 1 on the production of methane and VFA was tested in vivo on sheep. According to the test, four matured sheep, each fitted with a rumen cannula, were fed with 1.0 kg feed (dry weight)/day of a feed mix containing 40% by weight of a feed composition consisting of wheat, maize, barley, soya bean, sunflower seed, fishmeal, peas and rapeseed and 60% by weight of grass silage, at two equal meals. The sheep received the diet without or with the blend in a dosage of 110 mg per animal and day. The effect of the blend was evaluated according to a Latin square design with 4 rows and 4 columns, with each period lasting 6 weeks. Samples were not collected from the sheep during the initial 4 weeks of the period in order to allow the contents of their rumens to adapt to the new diet. After the initial 4 weeks rumen fluids were collected immediately before feeding and strained through a double layer of muslin. Incubation of each strained rumen fluid was performed in duplicate at 39° C. in Menke syringes. For further explanation see K. A. Menke and Steingass (1989), Animal Research and Development, 28, p 7-55. The total amount of VFA was determined after 0, 1, 2, 3 and 7 hours while the amount of methane was measured after 4 and 24 hours by using a gas chromography.

The following results were obtained.

|  |  | Control | Blend |
| --- | --- | --- | --- |
| Methane | ml/4 hours | 6.7 | 6.3 |
|  | ml/24 hours | 12.1 | 10.1 |
| Total amount volatile fatty acids, mmol/l | 0 hours | 41.6 | 42.2 |
|  | 1 hours | 65.8 | 68.5 |
|  | 2 hours | 70.8 | 73.2 |
|  | 3 hours | 63.9 | 67.0 |
|  | 7 hours | 54.2 | 57.5 |

From the results it is evident that methane production was lower when the diet contained the blend according to the invention in comparison with the control. Furthermore, the total VFA was higher, which also indicate a satisfactory rumen activity and an increased growth of the animals.

Example 3

A blend of essential oil compounds was prepared. The blend contained 0.24 ml of the dissolution of limonene in test 6, Example 1, 0.12 ml of the dissolution of eugenol in test 9, Example 1, 0.06 ml of the dissolution of quinoline in test 7, Example 1, 0.06 ml of the dissolution of benzyl salicylate in test 10, Example 1, 0.06 ml of the dissolution of vanilla in test 1, Example 1, 0.03 ml of the dissolution of thymol in test 2, Example 1, and 0.03 ml of dissolution of m-cresol in test 4, Example 1. The efficacy of this blend was tested in the same manner as in Example 1. The following results were obtained.

|  | Mmol methane | Mmol VFA |
| --- | --- | --- |
| Control | 761 | 430 |
| Mixture | 176 | 266 |

From the results it is evident that the decrease in the formation of methane is important in presence of the blend of the essential oil compounds according to the invention.

I claim:

1. A method for reducing the production of methane emanating from the digestive activities of an animal by using a mixture of essential oil compounds, which are administered to the animal, wherein the mixture contains:
   (a) 5-60% by weight of a mixture of limonene and eugenol,
   (b) a mixture of at least 10% by weight benzyl salicylate, at least 10% by weight quinoline, and at least 10% by weight vanilla, and
   (c) a mixture of thymol and cresol in an amount of 10 to 50% by weight based on the total amount of the limonene and eugenol mixture.

2. The method according to claim 1, wherein the mixture of essential oil compounds is administered per day in an amount of 0.01-50 mg per kg of bodyweight of the animal.

3. The method according to claim 1, wherein the mixture of essential oil compounds is administered via a feed composition or drinking water.

* * * * *